(12) United States Patent
Skjold-Larsen

(10) Patent No.: US 7,405,999 B2
(45) Date of Patent: Jul. 29, 2008

(54) SENSOR MODULE FOR TRAWL

(76) Inventor: Henning Skjold-Larsen, Øvre Strandvei 6, Tønsberg (NO) N-3120

( * ) Notice: Subject to any disclaimer, the term of this patent is extended or adjusted under 35 U.S.C. 154(b) by 219 days.

(21) Appl. No.: 10/596,279

(22) PCT Filed: Dec. 8, 2004

(86) PCT No.: PCT/NO2004/000377

§ 371 (c)(1),
(2), (4) Date: Aug. 1, 2006

(87) PCT Pub. No.: WO2005/055709

PCT Pub. Date: Jun. 23, 2005

(65) Prior Publication Data

US 2007/0089349 A1   Apr. 26, 2007

(30) Foreign Application Priority Data

Dec. 9, 2003   (NO) .................................. 20035478

(51) Int. Cl.
*A01K 73/04* (2006.01)
*A01K 73/10* (2006.01)

(52) U.S. Cl. .......................................... 367/106; 43/9.7
(58) Field of Classification Search ................. 367/106, 367/139; 43/9.1, 9.7
See application file for complete search history.

(56) References Cited

U.S. PATENT DOCUMENTS 3,444,510 A * 5/1969 Tyndale et al. ............. 367/106
3,651,595 A    3/1972 Newman
4,063,213 A    12/1977 Itria
4,197,591 A    4/1980 Hagemann
4,574,723 A    3/1986 Chiles
6,138,397 A    10/2000 Hammersland
2003/0056424 A1   3/2003 Mueller
2007/0089349 A1 * 4/2007 Skjold-Larsen ............... 43/9.1

FOREIGN PATENT DOCUMENTS

| EP | 0 263 615 | | 4/1988 |
| GB | 1 342 969 | | 1/1974 |
| GB | 2059172 A | * | 4/1981 |
| GB | 2350541 | | 6/2000 |
| WO | WO 81/03475 | | 12/1981 |

* cited by examiner

*Primary Examiner*—Dan Pihulic
(74) *Attorney, Agent, or Firm*—Christian D. Abel

(57) ABSTRACT

The invention relates to a module (100) which is attached to a trawl, and which at least comprises measuring sensors (330) and a power supply unit. (320) The sensors are basically inactive, but can be activated as the need arises to measure different parameters. In an embodiment the module also includes a power-generating movement device connected to a charging device that can supply energy to the power supply unit. The module may also include communication means. In an alternative embodiment the module ma include a trawl door that can drag the drawl in a desired direction. Several modules may be (combined to form a system that both measures different parameters and positions the trawl in order to achieve an optimal trawling process.

13 Claims, 2 Drawing Sheets

SENSOR MODULE FOR TRAWL

INTRODUCTION

The present invention relates to a module intended for use in connection with trawling. More specifically, it concerns a module for monitoring and optimising a trawl operation. The module, which is attached to the trawl, comprises at least measuring sensors and a power supply unit. The sensors are basically inactive, but can be activated as the need arises to measure different parameters.

In an embodiment the module also includes a power-generating movement device, which is connected to a charging device that can supply energy to the power supply unit. The module may also include communication means.

In an alternative embodiment the module may include a trawl door, which can drag the trawl in a desired direction. Several modules can be combined to form a system that both measures different parameters and positions the trawl for an optimal trawling process.

The invention also relates to a method for trawling using the module according to the invention.

PRIOR ART

Several different measuring systems and devices exist today for monitoring a trawling process. They may involve systems for measuring the size of the opening of the trawl, the speed of the trawl relative to the water, the amount of fish caught by the trawl, etc. Such information can be transmitted to the operator of the trawl and the trawl winch on the boat, thus enabling them to carry out actions in order to optimise the trawling process.

U.S. Pat. No. 6,138,397 describes a system for automatic control of the line tension based on measurements of the flow of water round the trawl opening. Sensors are placed round the trawl opening for measuring the direction of the flow of water into the trawl bag. The sensors send signals to adjusting devices, which can tighten and slacken the trawl cables in order to achieve optimal trawl operation.

Known systems are generally dependent on having several units with sensors at different locations. No known compact devices have been found comprising a plurality of sensors, which can be activated as the need for them arises and which are equipped with a power-generating unit, as in the present invention.

The inventive module is therefore both flexible and cost-effective.

SUMMARY OF THE INVENTION

The object of the present invention is to provide a module, a method and a system for monitoring and optimising a trawl operation.

The module for monitoring and optimising the trawl operation may be attached to a line connected to a trawl bag, and comprises at least a power supply unit, a plurality of measuring sensors and communication means, where one or more of the measuring sensors are arranged for activation from a trawler by means of control signals. The module can thereby be supplied with a plurality of sensors, where only a small number, e.g. two sensors are activated for measuring depth and temperature. Further sensors can be remotely activated by the user by means of a signal connection to a control device in the module. The user may, e.g. pay the supplier for an authentication code that can be transmitted to the module in order to activate further sensors.

In a preferred embodiment the module comprises an additional charging unit, which is connected to the power supply unit, and a power-generating movement device, which is set in motion by the dragging movement of the trawl bag, and which supplies energy to the charging unit. In an embodiment this movement device is a wheel that can roll along the seabed. In another embodiment it is a wheel on which are mounted vanes that can rotate both with and without seabed contact. In yet another embodiment the movement device is in the form of a propeller.

In another embodiment, the monitoring and optimising module can be connected to a trawl door, which can be positioned at different angles by means of a motor and which controls the module, thus enabling it to adjust the opening of the trawl bag. In such an embodiment the module may further comprise a sensor for measuring the angle of the trawl door.

The sensors included in the module may, for example, measure the distance from the module to the trawler, the distance between several modules, battery status, water depth, temperature, salt content, light, noise and other parameters that are important for monitoring and optimising the trawl operation.

The communication devices include a sonar that can be used both for communication and for frightening fish.

The invention also comprises a method for monitoring and optimising a trawl operation where one or more trawl bags are dragged behind a trawler via cables, and where the method includes the use of a module that is attached to the lines and is described in more detail above.

By combining a plurality of modules according to the invention, a system is obtained for monitoring and optimising a trawl operation where one or more trawl bags are dragged behind a trawler via cables. By combining the module with a dynamic device for optimising the trawl geometry, a complete and advantageous system will be achieved for an optimised trawl system. In such a system, modules and devices can communicate with one another and with the trawler.

The object of the invention described above is attained by means of the module, the method and the system as set forth in the attached set of claims.

DETAILED DESCRIPTION

The invention will now be described in greater detail with reference to the figures, in which.

Figure 1:
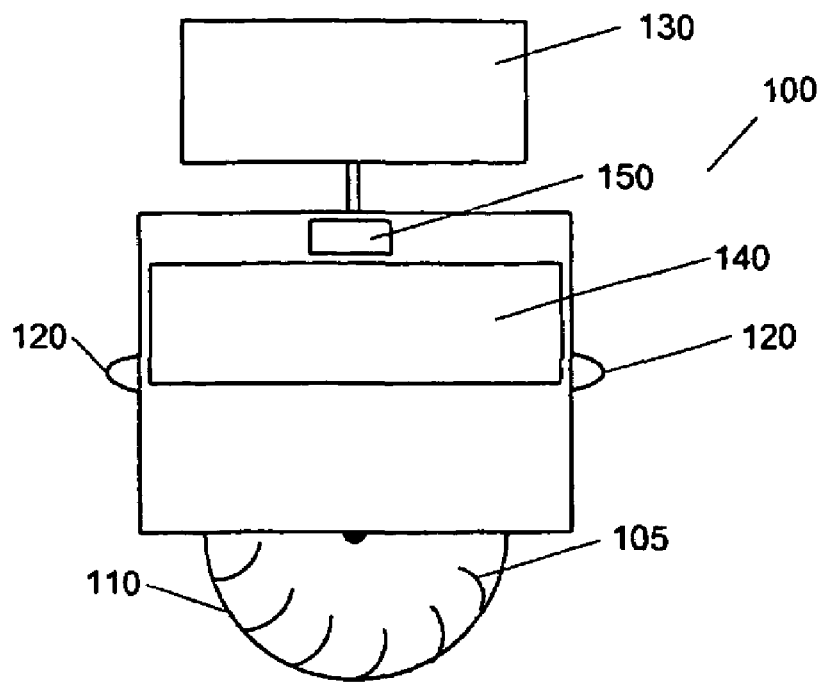
FIG. 1 is a view of an embodiment of the module in the invention.

FIG. 1 illustrates a first embodiment of the module according to the invention. The module 100 has attachment devices 120 which enable the module to be attached to lines between sweep (line attached to the trawl bag) and trawl (line attached to the trawler), with the result that the module 100 is in position between the trawler and the trawl bag or other locations in connection with the trawl bag. The module 100 includes at least one unit 140 comprising measuring sensors and power supply, which are described in more detail in FIG. 3. In addition the module 100 may comprise a power-generating movement device, which is set in motion by the dragging movement of the trawl bag. In an embodiment the movement device is a wheel 110, which can roll along the seabed.

In an embodiment, vanes 105 are mounted on the wheel 110 that cause the wheel 110 to rotate both with and without seabed contact.

In an embodiment the module 100 for monitoring and optimising a trawling process comprises a trawl door 130, which can be positioned at different angles by means of a control motor 150 that positions the module 100 in such a manner that it can adjust the opening of the trawl bag.

Figure 2:
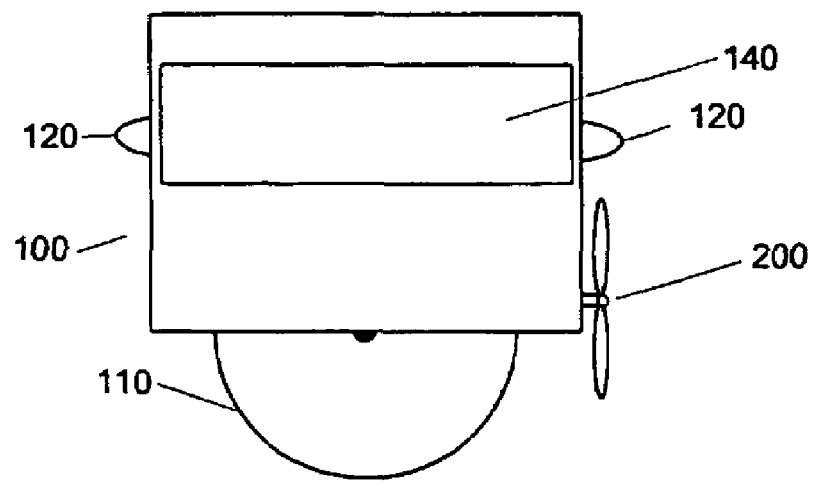
FIG. 2 is a view of an alternative embodiment of the module.

FIG. 2 illustrates an alternative embodiment of the module 100 where it is equipped with a propeller 200 in addition to the wheel 110. The propeller 200 will be capable of indirectly supplying energy to the unit 140 containing the measuring sensors. In another embodiment the module 100 may be equipped only with a propeller 200 and no wheel 110. In another embodiment it may be equipped with only the wheel 100. In yet another embodiment the module 100 may be equipped with both. How the module 100 is equipped will be dependent on the different areas of application for the module 100.

Figure 3:
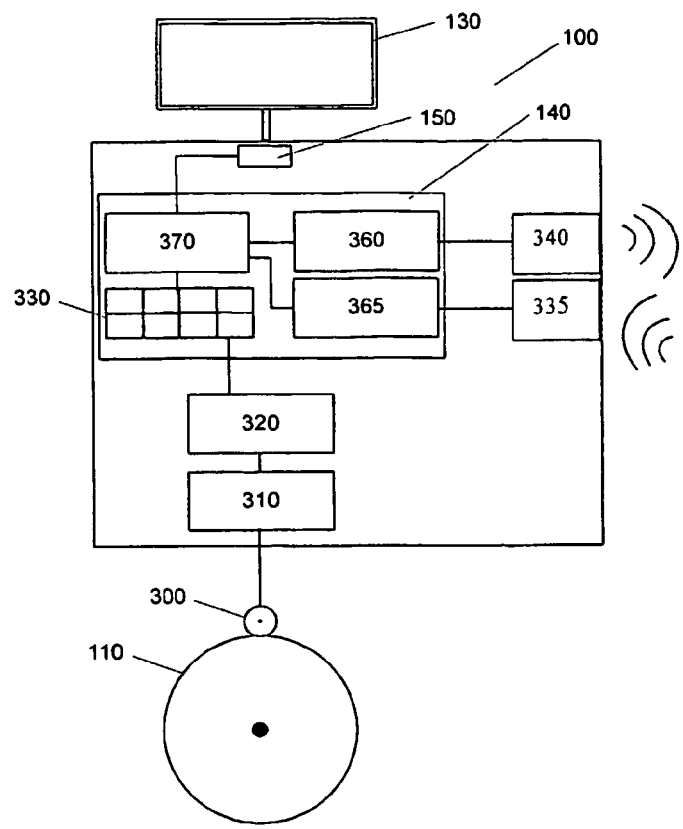
FIG. 3 illustrates in more detail what the module may include.

FIG. 3 illustrates in more detail what the module 100 may contain. The unit 140 is composed of different components for transmitting and receiving signals, interpreting signals, and for performing different measurements. The measurements are performed by means of measuring sensors 330. The measuring sensors 330 can measure different parameters such as the distance from the module 100 to the trawler, the distance between several modules 100, water depth, temperature, salt content, light, battery voltage, noise and any other parameters that are important for monitoring and optimising the trawl operation. The measuring sensors 330 are supplied with power from a power supply unit 320, which is usually a battery.

A distinctive and unique feature of the present invention is that one or more of the measuring sensors are arranged for activation by means of control signals, i.e. they are inactive until they are activated.

The term inactive sensor refers to a sensor that consumes a minimum of power. It is therefore incapable of performing measurements, but can receive a signal that causes it to become active, whereupon it can perform the measurements for which it is designed.

There are several advantages of such a property and design.

Firstly, power will be saved if only a few of the measuring sensors 330 included in the module 100 are activated.

Secondly, the module 100 can be produced as one unit that includes all the sensor types that various user groups may expect to want to use. The module 100 can therefore be produced in greater quantities than if various units were to be produced including different numbers of various sensor types.

The module 100 is preferably equipped with a sonar 340 and a hydrophone 335, which are connected to a transmitter 360 and a receiver 365 respectively. The signals received may be control signals that will activate one or more sensors 330, which are currently inactive. There is a control device 370, which will implement the activation after the control signals have been interpreted and processed. It is also the control device 370, which receives measured data from the various measuring sensors 330 and which ensures that relevant measured data can be transmitted via the transmitter 360 and the sonar 340 to, for example, a fishing vessel in the vicinity to enable the results of the measurements to be further processed there. The module 100 can also transmit measured data and control signals to other similar modules 100 which interact and form a system for optimising the trawl operation.

A person skilled in the art will appreciate that by means of the module 100 in the invention it will also be possible to deactivate sensors 330 which are no longer required to be active.

The sonar 340 can also be used to frighten fish, thus causing them to swim into the trawl bag 410.

On acquiring a module 100 according to the invention, it can be activated for use with a basic stock of measuring sensors, e.g. two sensors for measuring depth and temperature respectively. Further sensors can be activated by the user by means of a signal connection to a control device 370 in the unit 140. The signal connection is preferably radio-controlled. Control signals can be transmitted from a trawler by means of a sonar, and received by a hydrophone 335, which is incorporated in the unit 140. The signals are interpreted by the control device 370 and the relevant command is implemented by the control device 370. This may be, e.g. to activate a sensor for measuring the salt content of the water. The signal with the command for activating one or more sensors may contain a code that can be obtained, e.g. from the supplier of the module 100. The user of the module 100 may then, e.g. receive an authentication code that can be transmitted to the module 100 in order to activate further sensors.

As already mentioned, in an embodiment the module 100 may be connected with a trawl door 130. When mounted in this manner the module also includes a control motor 150 for angling the trawl door 130 in addition to a sensor for measuring the angling of the trawl door 130. Thereupon, on the basis of measurements from the measuring sensors 330, the module will control the motor in order to optimise a trawling process.

In a preferred embodiment the module 100 includes a charging unit 310 connected to the power supply unit 320. The charging unit 310 contains electronics that ensure a stable voltage supply to the battery, and for instance a dynamo 300 that supplies power to the charging unit 310 when the dynamo 300 rotates. It can do this since it is connected to a power-generating movement device, which in FIG. 3 is a wheel 110.

The wheel 110 rotates on contact with the seabed. As mentioned previously vanes 105 may be mounted on the wheel 110, which cause the wheel 110 to rotate both with and without seabed contact. In this case it is only the dragging of the trawl to which the module 100 is attached which will cause the wheel 110 with the vanes 105 to rotate, and which in turn causes the dynamo 300 to be supplied with energy from the movement device. In yet another embodiment a propeller device 200 may be mounted on the module 100, providing a similar effect.

Figure 4:
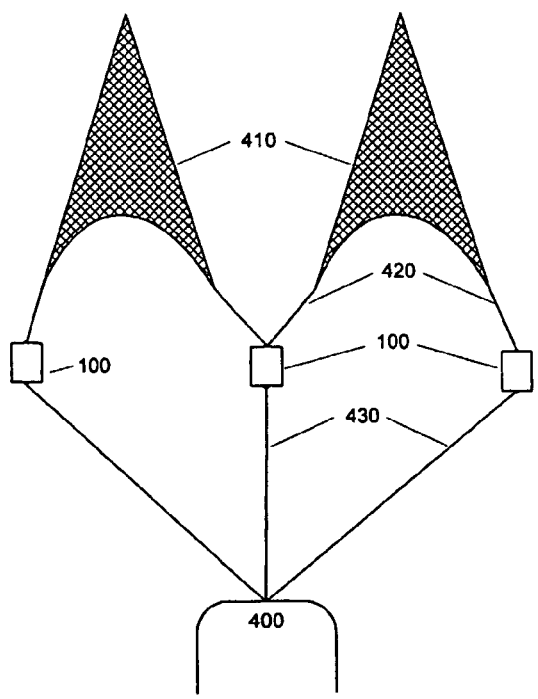
FIG. 4 is a view of a system with several modules attached to the trawl.

FIG. 4 is a view of the whole system with several modules 100 attached to lines 420 and 430 between trawl bags 410 and a trawler 400. With an arrangement of this kind the module 100 in the invention can be used in a complete system in order to monitor and optimise a trawl operation. This is one of the objects of the present invention. In such an arrangement the module 100 in the invention is preferably equipped with a trawl door 130 that can be guided into a desired position in order to adjust the opening of the trawl bags 410. The control of the position of the trawl door 130 may, e.g. be determined by the distance between several modules 100. It may be a fully automatic process without the influence of an operator on board the trawler 400. It may also be a process where, based on received measured data from the modules 100, an operator performs an action that can adjust the trawl doors 130 into the desired position.

The module 100 in the invention and the system described above are flexible and cost-effective. Due to the fact that one or more measuring sensors 330 included in the module 100 are only activated when required, and by equipping the module 100 with an energy-generating unit, inspection and maintenance of the unit will be facilitated. Before the initial deployment of a module 100, the batteries can be charged on board the trawler. During the actual trawl operation, as mentioned above, it will be possible to supply energy to the power supply unit in the module 100, and thus there will be no need for frequent charging on board a trawler 400.

The figures and the description according to the present invention refer to a preferred embodiment. For a person skilled in the art it will be obvious that different variations of the invention can be derived without deviating from the scope of the invention. It is, e.g. natural to combine one or more modules 100 with one or more other devices that can provide dynamic adjustment of the lines between warp and sweep in order to ensure a further optimisation of the trawling process.

The invention claimed is:

1. A module (100) for monitoring and optimising a trawl operation where the module (100) is arranged for attachment to a line (420) connected to a trawl bag (410), and where the module (100) at least comprises a power supply unit (320), a plurality of measuring sensors (330), and
   communication means, characterised in that one or more of the measuring sensors (330) are arranged to be remotely activated by means of control signals.

2. A module (100) according to claim 1,
   characterised in that the communication means comprise a sonar (340) and a hydrophone (335) connected to a transmitter device (360) and a receiver device (365) respectively, where the receiver device (365) receives control signals that are processed in a control device (370) for activating one or more selected measuring sensors (330).

3. A module (100) according to claim 1,
   characterised in that the module (100) further comprises a charging unit (310) connected to the power supply unit (320).

4. A module (100) according to claim 1,
   characterised in that the module (100) is further connected to a trawl door (130), which it controls.

5. A module (100) according to claim 1,
   characterised in that the sensors (330) are arranged to measure the distance from the module (100) to the trawler (400), the distance between several modules (100), depth, temperature, salt content, light, noise and other parameters that are important for monitoring and optimising the trawl operation.

6. A module (100) according to claim 3,
   characterised in that the charging unit (310) is connected to a power generator (300) which is set in motion and generates power by being connected to a power-generating movement device.

7. A module (100) according to claim 4,
   characterised in that the module (100) contains a sensor for measuring the angle of the trawl door (130).

8. A module (100) according to claim 6,
   characterised in that the power-generating movement device is a wheel (110) that can roll along the seabed.

9. A module (100) according to claim 6,
   characterised in that the power-generating movement device is a wheel (110) on which are mounted vanes (105) which rotate both with and without seabed contact.

10. A module (100) according to claim 6,
    characterised in that the power-generating movement device is in the form of a propeller (200).

11. A method for monitoring and optimising a trawl operation where one or more trawl bags (410) are dragged behind a trawler (400) via lines (420, 430), and where the method involves use of a module (100) arranged for attachment to the lines (420, 430), and where the module (100) at least comprises a power supply unit (320), a plurality of measuring sensors (330) and communication means,
    characterised in that the measuring sensors (330) are arranged to be remotely activated by means of control signals.

12. A method according to claim 11,
    characterised in that the communication means include a sonar (340) and a hydrophone (335), where the sonar (350) can be used both for communication and for frightening fish.

13. A system for monitoring and optimising a trawl operation where one or more trawl bags (410) are dragged behind a trawler (400) via lines (420, 430), and where the system includes at least two modules (100) which are attached to the lines (420, 430), and where the modules (100) at least comprise a power supply unit (320), a plurality of measuring sensors (330) and communication means,
    characterised in that the measuring sensors (330) are arranged to be remotely activated by means of control signals.

* * * * *